US009755778B2

(12) United States Patent
Doo et al.

(10) Patent No.: US 9,755,778 B2
(45) Date of Patent: Sep. 5, 2017

(54) OPTICAL NETWORK UNIT (ONU) FOR LOW LATENCY PACKET TRANSMISSION IN TIME DIVISION MULTIPLEXING-PASSIVE OPTICAL NETWORK (TDM-PON), METHOD OF OPERATING THE SAME, AND APPARATUS FOR CONTROLLING ONU

(71) Applicant: ELECTRONICS AND TELECOMMUNICATIONS RESEARCH INSTITUTE, Daejeon-si (KR)

(72) Inventors: Kyeong Hwan Doo, Daejeon-si (KR); Sang Soo Lee, Daejeon-si (KR); Jun Seong Bang, Daejeon-si (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/071,702

(22) Filed: Mar. 16, 2016

(65) Prior Publication Data
US 2016/0277142 A1    Sep. 22, 2016

(30) Foreign Application Priority Data
Mar. 17, 2015 (KR) .......... 10-2015-0036875

(51) Int. Cl.
*H04J 14/08* (2006.01)
*H04B 10/27* (2013.01)

(52) U.S. Cl.
CPC .............. *H04J 14/08* (2013.01); *H04B 10/27* (2013.01)

(58) Field of Classification Search
None
See application file for complete search history.

(56) References Cited

U.S. PATENT DOCUMENTS

| 8,144,646 B2 * | 3/2012 | Zha ..................... H04L 41/5061 370/328 |
| 8,213,800 B1 | 7/2012 | Liu et al. |
| 2007/0071031 A1 * | 3/2007 | Shin ..................... H04J 3/1694 370/468 |
| 2007/0121573 A1 * | 5/2007 | Zuckerman ........... H04W 92/02 370/350 |
| 2007/0133557 A1 * | 6/2007 | Lee ........................ H04J 3/1694 370/395.4 |

(Continued)

FOREIGN PATENT DOCUMENTS

JP    2011-234242 A    11/2011

*Primary Examiner* — Oommen Jacob
(74) *Attorney, Agent, or Firm* — Ladas & Parry LLP; Loren K. Thompson

(57) ABSTRACT

Provided are an Optical Network Unit (ONU) for low latency packet transmission in a Time Division Multiplexing-Passive Optical Network (TDM-PON), a method of operating the ONU, and an apparatus for controlling the ONU. The method includes: receiving, from a base station, first bandwidth allocation information regarding a bandwidth allocated by the base station to a terminal for uplink packet transmission; and transmitting a bandwidth allocation request, which is based on the received first bandwidth allocation information, to an Optical Line Terminal (OLT) before completing packet reception from the base station.

19 Claims, 6 Drawing Sheets

(56) References Cited

U.S. PATENT DOCUMENTS

| | | | |
|---|---|---|---|
| 2007/0189771 A1* | 8/2007 | Kim | H04J 3/1694 398/69 |
| 2008/0063397 A1* | 3/2008 | Hu | H04J 14/0282 398/43 |
| 2009/0214206 A1* | 8/2009 | Ozaki | H04B 10/25754 398/43 |
| 2010/0003030 A1 | 1/2010 | Gilfedder et al. | |
| 2010/0061401 A1* | 3/2010 | Nakahira | H04L 12/5695 370/468 |
| 2010/0098414 A1* | 4/2010 | Kramer | H04L 47/10 398/45 |
| 2011/0305455 A1* | 12/2011 | Helleberg Andersen | H04J 14/00 398/41 |
| 2012/0243871 A1* | 9/2012 | Huang | H04B 10/272 398/58 |
| 2014/0178076 A1* | 6/2014 | Fang | H04J 14/0238 398/98 |
| 2014/0294388 A1* | 10/2014 | Odaka | H04B 10/27 398/66 |
| 2015/0208347 A1* | 7/2015 | Iiyama | H04L 12/12 370/311 |
| 2015/0229397 A1* | 8/2015 | Shibata | H04B 10/25754 398/115 |
| 2015/0311980 A1* | 10/2015 | Kuwano | H04L 12/2861 398/58 |
| 2015/0373640 A1* | 12/2015 | Iiyama | H04Q 11/0067 398/45 |
| 2016/0261935 A1* | 9/2016 | Bang | H04B 10/2503 |
| 2016/0277142 A1* | 9/2016 | Doo | H04B 10/27 |
| 2016/0285546 A1* | 9/2016 | Zeng | H04B 10/07 |

\* cited by examiner

OPTICAL NETWORK UNIT (ONU) FOR LOW LATENCY PACKET TRANSMISSION IN TIME DIVISION MULTIPLEXING-PASSIVE OPTICAL NETWORK (TDM-PON), METHOD OF OPERATING THE SAME, AND APPARATUS FOR CONTROLLING ONU

CROSS-REFERENCE TO RELATED APPLICATION(S)

This application claims priority from Korean Patent Application No. 10-2015-0036875, filed on Mar. 17, 2015 in the Korean Intellectual Property Office, the entire disclosure of which is incorporated herein by references for all purposes.

BACKGROUND

1. Field

The following description generally relates to a backhaul network technology using a Time Division Multiplexing-Passive Optical Network (TDM-PON), and more particularly to an Optical Network Unit (ONU) for low latency packet transmission in the TDM-PON, a method of operating the same, and an apparatus for controlling the ONU.

2. Description of the Related Art

As mobile communications traffic increases rapidly every year, throughput of base stations also increases, and the number of required base stations also increases with miniaturization of cells. Wireless backhaul technology has been recently introduced, but a large amount of traffic is currently transmitted through optical fiber cables.

There has been an attempt to apply the passive optical network (PON) technology, which is highly price-competitive, to a backhaul network based on optical fiber cable. The PON technology may include Wavelength Division Multiplexing (WDM) and Time Division Multiplexing (TDM), in which the TDM is highly price-competitive, but when applied to a backhaul network, the TDM may result in long latency in uplink packet transmission between base stations and a wireless toll center; and the WDM, which employs 1:1 connection, has short latency and may guarantee a fixed bandwidth but is expensive.

The next-generation mobile communication service requires a network that enables low latency for services of sensory effects and the like. The TDM-PON, which may be applied to a backbone network, has long latency, such that it is required to reduce latency to use the TDM-PON for the next-generation mobile communication service.

SUMMARY

Provided is an ONU for low latency packet transmission in TDM-PON, a method of operating the same, and an apparatus for controlling the ONU, in which the ONU checks in advance bandwidths allocated to terminals, and then receives a PON bandwidth in advance from the OLT, so that an uplink transmission latency may be minimized.

In one general aspect, there is provided a method of operating an Optical Network Unit (ONU) for low latency packet transmission in a Time Division Multiplexing-Passive Optical Network (TDM-PON), the method including: receiving, from a base station, first bandwidth allocation information regarding a bandwidth allocated by the base station to a terminal for uplink packet transmission; and transmitting a bandwidth allocation request, which is based on the received first bandwidth allocation information, to an Optical Line Terminal (OLT) before completing packet reception from the base station.

The transmitting may include: analyzing the received first bandwidth allocation information to estimate an amount of packets to be received from the base station; and transmitting the bandwidth allocation request, which includes the estimated amount of packets, to the OLT.

The transmitting may include: determining a bandwidth allocation request time by considering a pre-stored first duration and second duration; and transmitting the bandwidth allocation request to the OLT at the determined bandwidth allocation request time.

The first duration may be a duration from a time when the base station allocates a bandwidth to the terminal to a time when the ONU completes packet reception.

The second duration may be a duration from a time when the ONU transmits the bandwidth allocation request to the OLT to a time when the ONU receives, from the OLT, second bandwidth allocation information regarding a bandwidth allocated to the ONU.

The determining of the bandwidth allocation request time may include determining the bandwidth allocation request time to minimize a packet waiting time in the ONU.

The determining of the bandwidth allocation request time may include determining the bandwidth allocation request time by adding a time duration difference between the first duration and the second duration to the time when the bandwidth is allocated to the terminal.

The method may further include: receiving, from the OLT, the second bandwidth allocation information regarding a bandwidth allocated to the ONU; and transmitting the packets, received from the base station, to the OLT based on the received second bandwidth allocation information.

The second bandwidth allocation information may include a transmission start time and a transmission duration.

In another general aspect, there is provided an Optical Network Unit (ONU) for low latency packet transmission in a Time Division Multiplexing-Passive Optical Network (TDM-PON), the ONU including: a first bandwidth allocation information manager configured to receive, from a base station, first bandwidth allocation information regarding a bandwidth allocated by the base station to a terminal for uplink packet transmission; and a bandwidth allocation requester configured to transmit a bandwidth allocation request, which is based on the received first bandwidth allocation information, to an Optical Line Terminal (OLT) before completing packet reception from the base station.

The first bandwidth allocation information manager may analyze the received first bandwidth allocation information to estimate an amount of packets to be received from the base station; and the bandwidth allocation requester may transmit the bandwidth allocation request, which includes the estimated amount of packets, to the OLT.

The ONU may further include: a storage configured to store a first duration and second duration; and a bandwidth allocation request time determiner configured to determine a bandwidth allocation request time by considering the stored first duration and second duration, in which the bandwidth allocation requester may transmit the bandwidth allocation request to the OLT at the determined bandwidth allocation request time.

The first duration may be a duration from a time when the base station allocates a bandwidth to the terminal to a time when the ONU completes packet reception.

The second duration may be a duration from a time when the ONU transmits the bandwidth allocation request to the OLT to a time when the ONU receives, from the OLT, second bandwidth allocation information regarding a bandwidth allocated to the ONU.

The bandwidth allocation request time determiner may determine the bandwidth allocation request time to minimize a packet waiting time in the ONU.

The bandwidth allocation request time determiner may determine the bandwidth allocation request time by adding a time duration difference between the first duration and the second duration to the time when the bandwidth is allocated to the terminal.

The ONU may further include a second bandwidth allocation information receiver configured to receive, from the OLT, the second bandwidth allocation information regarding a bandwidth allocated to the ONU, in which a packet sender transmits the packets, received from the base station, to the OLT based on the received second bandwidth allocation information.

The second bandwidth allocation information may include a transmission start time and a transmission duration.

In yet another general aspect, there is provided an apparatus for controlling an Optical Network Unit (ONU) for low latency packet transmission in a Time Division Multiplexing-Passive Optical Network (TDM-PON), the apparatus including: a first bandwidth allocation information manager configured to receive, from a base station, first bandwidth allocation information regarding a bandwidth allocated by the base station to a terminal for uplink packet transmission, and analyze the received first bandwidth allocation information to estimate an amount of packets to be received from the base station; a storage configured to store a first duration and a second duration; and a bandwidth allocation request time determiner configured to determine a bandwidth allocation request time by considering the stored first duration and second duration, in which the apparatus controls the ONU to transmit the bandwidth allocation request, which includes the estimated amount of packets, to the OLT at the determined bandwidth allocation request time.

The first duration may be a duration from a time when the base station allocates a bandwidth to the terminal to a time when the ONU completes packet reception; and the second duration may be a duration from a time when the ONU transmits the bandwidth allocation request to the OLT to a time when the ONU receives, from the OLT, second bandwidth allocation information regarding a bandwidth allocated to the ONU.

Figure 1:
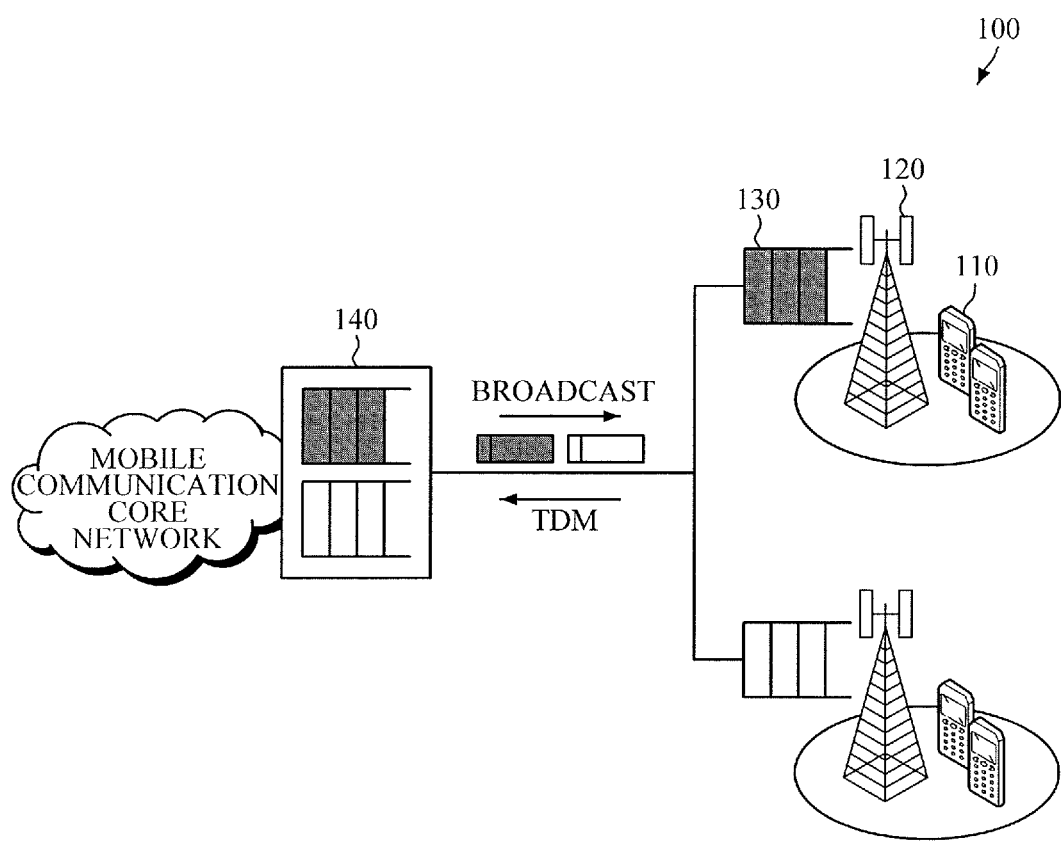
FIG. 1 is a diagram schematically illustrating an example of a backhaul network system based on Time Division Multiplexing-Passive Optical Network (TDM-PON).

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, exemplary embodiments of the present disclosure will be described with reference to the accompanying drawings. In the following description, a detailed description of known functions and configurations incorporated herein will be omitted when it may obscure the subject matter of the present invention. Further, the terms used throughout this specification are defined in consideration of the functions according to exemplary embodiments, and can be varied according to a purpose of a user or manager, or precedent and so on. Therefore, definitions of the terms should be made on the basis of the overall context.

FIG. 1 is a diagram schematically illustrating an example of a backhaul network system based on Time Division Multiplexing-Passive Optical Network (TDM-PON).

Referring to FIG. 1, the backhaul network system 100 based on TDM-PON includes a terminal 110, a base station 120, an Optical Network Unit (ONU) 130, and an Optical Line Terminal (OLT) 140.

The terminal 110 may be a mobile user-side device or a fixed-type user-side device, such as User Equipment (UE), Mobile Station (MS), or relay node. The base station 120 may be any network-side node, such as Node B, eNode B, Base Station, or Access Point (AP), which communicates with terminals.

The terminal 110 may receive a packet from the base station 120 through a downlink, and may transmit the received packet to the base station 120 through an uplink.

The terminal 110 may transmit a packet to the base station 120 by transmitting a bandwidth allocation request to the base station 120, by receiving information on an allocated bandwidth from the base station 120 (hereinafter referred to as first bandwidth allocation information), and by using the received first bandwidth allocation information.

Upon receiving the bandwidth allocation request from the terminal 110, the base station 120 allocates a bandwidth to the terminal 110 in response to the request, and may transmit the first bandwidth allocation information to the terminal 110 and the ONU 130. Further, the base station 120 may transmit a packet, received from the terminal 110, to the ONU 130.

The ONU 130, which is an optical subscriber terminal, may be located in the base station 120 or in the vicinity thereof, and the OLT 140, which is a central office device, may be located in a central office or a wireless central office.

In the case of downlink packet transmission from the OLT 140 to the ONU 130, packet transmission between the OLT 140 and the ONU 130 may be made by broadcasting, and in the case of uplink packet transmission from the ONU 130 to the OLT 140, packet transmission between the OLT 140 and the ONU 130 may be made by Time Division Multiplexing (TDM).

Based on the first bandwidth allocation information received from the base station 120, the ONU 130 may transmit, to the OLT 140, a request for bandwidth allocation for uplink transmission of a packet received or to be received from the base station 120 before completing packet reception from the base station 120.

The ONU 130 may receive, from the OLT 140, information on a bandwidth allocated to the ONU 130 (hereinafter referred to as "second bandwidth allocation information") in response to the bandwidth allocation request, and may transmit a packet to the OLT 140 by using the received second bandwidth allocation information.

Upon receiving the bandwidth allocation request from the ONU 130, the OLT 140 allocates a bandwidth to the ONU 130 in response to the request, and may transmit the second bandwidth allocation information to the ONU 130. In this case, the second bandwidth allocation information may include an uplink transmission time, i.e., a transmission start time and a transmission duration which may be used by the ONU 130.

Hereinafter, uplink packet transmission in the backhaul network system 100 based on TDM-PON will be described in detail with reference to FIG. 2.

Figure 2:
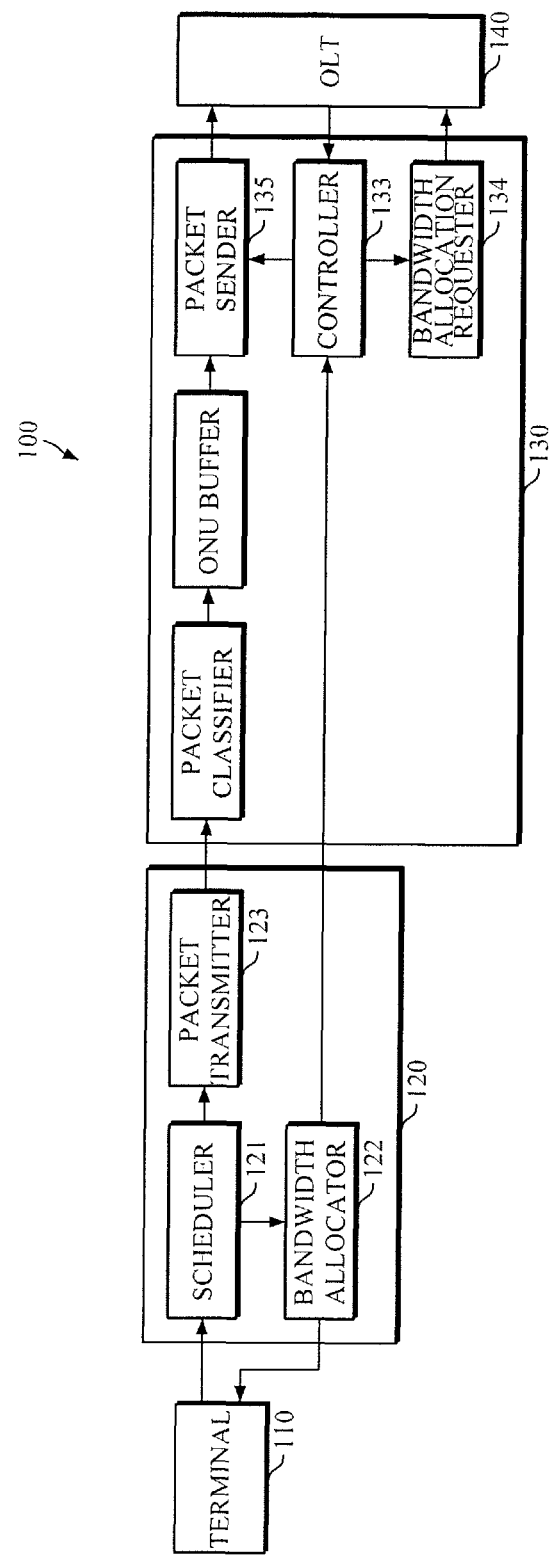
FIG. 2 is a detailed diagram illustrating an example of the backhaul network system based on TDM-PON illustrated in FIG. 1.

FIG. 2 is a detailed diagram illustrating an example of the backhaul network system 100 based on TDM-PON illustrated in FIG. 1

Referring to FIG. 2, the base station 120 includes a scheduler 121, a bandwidth allocator 122, and a packet transmitter 123.

The scheduler 121 may receive a bandwidth allocation request from the terminal 110. Further, the scheduler 121 may receive packets from the terminal 110, and may classify the received packets according to terminal identifiers.

Upon receiving the bandwidth allocation request from the terminal 110, the bandwidth allocator 122 may allocate a bandwidth to the terminal 110 according to a quality of service level, such as a required amount, a guaranteed bandwidth, and the like. When receiving requests for bandwidth allocation from a plurality of terminals, the bandwidth allocator 122 may equally allocate bandwidth s to each terminal according to a quality of service level of each terminal.

The bandwidth allocator 122 may transmit information on a bandwidth allocated to the terminal 110, i.e., the first bandwidth allocation information, to the terminal 110 and the ONU 130.

The packet transmitter 123 may reassemble packets, which have been classified according to terminal identifiers, based on characteristics of each packet, or may change, correct, or delete packet header information, reconfigure the packet header information by using an Ethernet frame, and may transmit the reconfigured packet header information to the ONU 130.

The ONU 130 may include a packet classifier 131, an ONU buffer 132, a controller 133, a bandwidth allocation requester 134, and a packet sender 135.

The packet classifier 131 may receive packets from the packet transmitter 123, and may classify the received packets according to Quality of Service (QoS) levels.

The QoS levels may be shared in advance between the ONU 130 and the base station 120. In the case where there is a difference in classification of QoS levels between the ONU 130 and the base station 120, the packet classifier 131 may store information for matching the information of QoS levels of the ONU 130 and the base station 120.

The ONU buffer 132 may store packets, received from the packet transmitter 123 of the base station 120, until the packets are transmitted to the OLT 140 through the packet sender 135. In one exemplary embodiment, as packets are classified and managed according to QoS levels, the ONU buffer 132 may store packets, classified as having an identical QoS level, in one service storage space. In this case, each service storage space of the ONU buffer 132 may be managed by a First In First Out (FIFO) method.

The controller 133 may receive the first bandwidth allocation information from the bandwidth allocator 122 of the base station 120, and based on the received first bandwidth allocation information, the controller 133 may control the bandwidth allocation requester 134 to transmit a request for bandwidth allocation for uplink transmission to the OLT 140 before completing packet reception from the base station 120.

Further, the controller 133 may receive information on a bandwidth allocated to the ONU 130, i.e., the second bandwidth allocation information, from the OLT 140, and based on the second bandwidth allocation information, the controller 133 may control the packet sender 135 to send packets stored in the ONU buffer 132 to the OLT 140.

The controller 133 will be described in detail later with reference to FIG. 3.

The bandwidth allocation requester 134 may transmit the request for bandwidth allocation for uplink transmission to the OLT 140 according to the control of the controller 133.

In one exemplary embodiment, the bandwidth allocation requester 134 may transmit, according to the control of the controller 133, a bandwidth allocation request, which includes information on an amount of packets estimated by analysis of the first bandwidth allocation information, to the OLT 140.

In another exemplary embodiment, the bandwidth allocation requester 134 may transmit, according to the control of the controller 133, a bandwidth allocation request, which includes information on packets estimated by analysis of the first bandwidth allocation information and information on a remaining packet amount of the ONU buffer 132, to the OLT 140. In this case, the remaining packet amount of the ONU buffer 132 refers to an amount of packets remaining in the ONU buffer 132. The ONU 130 may not receive as many bandwidths as it has requested from the OLT 140. In this case, all the packets stored in the ONU buffer 132 are not transmitted to the OLT 140, with some of the packets remaining in the ONU buffer 132. Accordingly, in the case where an additional bandwidth allocation request is required, the ONU 130 may transmit a bandwidth allocation request to the OLT 140 by considering a remaining packet amount.

The request for bandwidth allocation is transmitted before the ONU 130 completes packet reception from the base station 120, which will be described in detail later with reference to FIG. 3.

The packet sender 135 may transmit packets stored in the ONU buffer 132 to the OLT 140 based on the second bandwidth allocation information. For example, the packet sender 135 may transmit packets stored in the ONU buffer 132 to the OLT 140 at an uplink transmission time allocated by the OLT 140 to the ONU 130.

Figure 3:
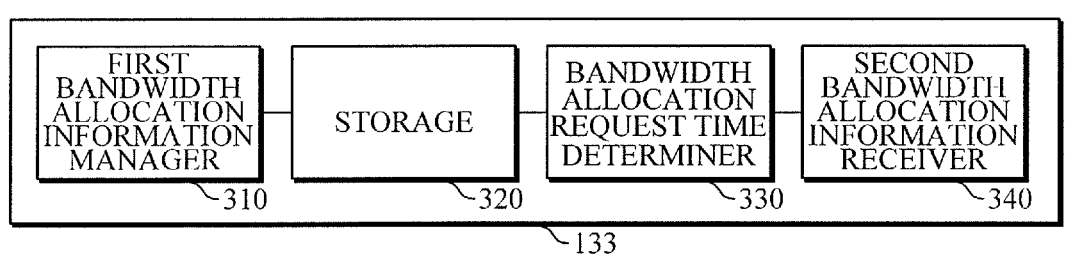
FIG. 3 is a detailed diagram illustrating an example of a controller illustrated in FIG. 2.

FIG. 3 is a detailed diagram illustrating an example of the controller 133 illustrated in FIG. 2.

Referring to FIG. 3, the controller 133 includes a first bandwidth allocation information manager 310, a storage 320, a bandwidth allocation request time determiner 330, and a second bandwidth allocation information receiver 340.

The first bandwidth allocation information manager 310 may receive the first bandwidth allocation information from the bandwidth allocator 122 of the base station 120, and based on the received first bandwidth allocation information, the first bandwidth allocation information manager 310 may estimate an amount of packets to be received from the base station 120. The base station 120 allocates bandwidths to the terminal 110 by considering the amount of packets to be received from the terminal 110. Accordingly, the first bandwidth allocation information manager 310 may estimate the amount of packets to be received by the ONU 130 from the terminal 110 through the base station 120 by analyzing the first bandwidth allocation information.

The storage 320 may store a duration from the time when the base station 120 allocates a bandwidth to the time when the ONU 130 completes packet reception (hereinafter referred to as a "first duration"). In this case, the time when the ONU 130 has completed packet reception may refer to a time when a packet is received from the base station 120, and the received packet is stored in the ONU buffer 132.

Further, the storage 320 may store a duration from the time when the ONU 130 transmits a bandwidth allocation request to the OLT 140 to the time when the ONU 130 receives the second bandwidth allocation information from the OLT 140 (hereinafter referred to as a "second duration").

The bandwidth allocation request time determiner 330 may determine a bandwidth allocation request time based on the first duration and the second duration stored in the storage 320, so as to minimize a packet waiting time in the ONU buffer 132.

In order to transmit packets from the ONU 130 to the OLT 140, the first duration is required when packets stored in the ONU buffer 132 are transmitted, and the second duration is required when packets are transmitted by using a bandwidth allocated by the OLT 140. In the case where a bandwidth allocation request time is determined without appropriate consideration of the first duration and the second duration, the packet waiting time in the ONU buffer 132 may become longer, or there may be a case where packets are required to be transmitted to the OLT 140, although there are no packets that may be transmitted, with no packets being stored in the ONU buffer 132.

For example, in the case where a bandwidth allocation request is transmitted to the OLT 140 immediately before completing storage of packets in the ONU buffer 132, i.e., immediately before lapse of the first duration after the time where a bandwidth is allocated to the terminal 110, the packet is transmitted to the OLT 140 after waiting for almost the second duration in the ONU buffer 132, since it requires time to allocate a bandwidth. Further, in the case where a bandwidth allocation request is transmitted to the OLT 140 immediately after a bandwidth has been allocated to the terminal 110, there may be no packets stored in the ONU buffer 132 since the first duration does not elapse after a bandwidth has been allocated to the terminal 110, despite the fact that packets are required to be transmitted to the OLT 140 after lapse of the second duration upon receiving the bandwidth allocation request.

Accordingly, in order to minimize the packet waiting time in the ONU buffer 312, the bandwidth allocation request time determiner 330 may determine a bandwidth allocation request time by appropriately considering the first duration and the second duration.

In one exemplary embodiment, the bandwidth allocation request time determiner 330 may determine the bandwidth allocation request time by using the following Equation 1.

Bandwidth allocation request time=time when bandwidth is allocated to terminal+(first duration−second duration) [Equation 1]

That is, the bandwidth allocation request time determiner 330 may determine the bandwidth allocation request time by adding a time duration difference between the first duration and the second duration to the time when a bandwidth is allocated to the terminal 110.

The second bandwidth allocation information receiver 340 may receive the second bandwidth allocation information from the OLT 140.

Figure 4:
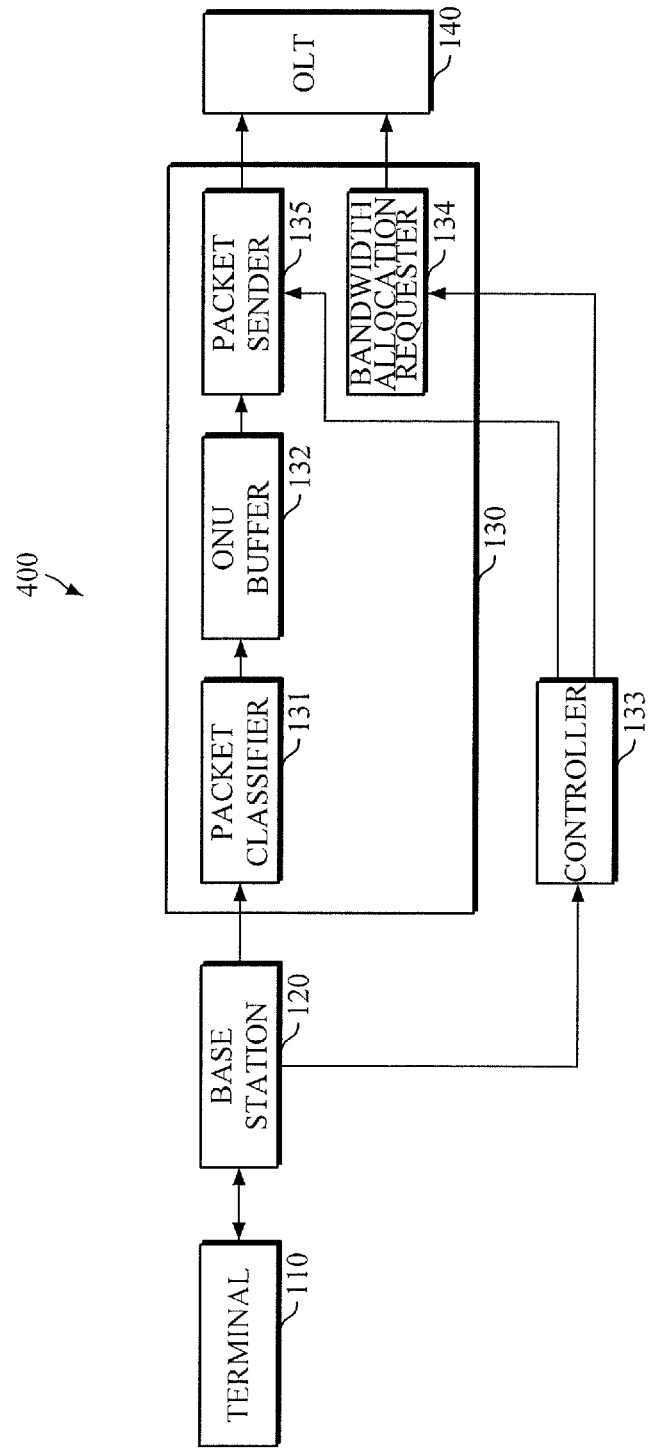
FIG. 4 is a diagram illustrating another example of the backhaul network system based on TDM-PON.

FIG. 4 is a diagram illustrating another example of the backhaul network system based on TDM-PON.

Referring to FIGS. 2 and 4, unlike the backhaul network system 100 based on TDM-PON, the backhaul network system 400 based on TDM-PON may include the controller 133 on the outside of the ONU 130 as a separate device.

Figure 5:
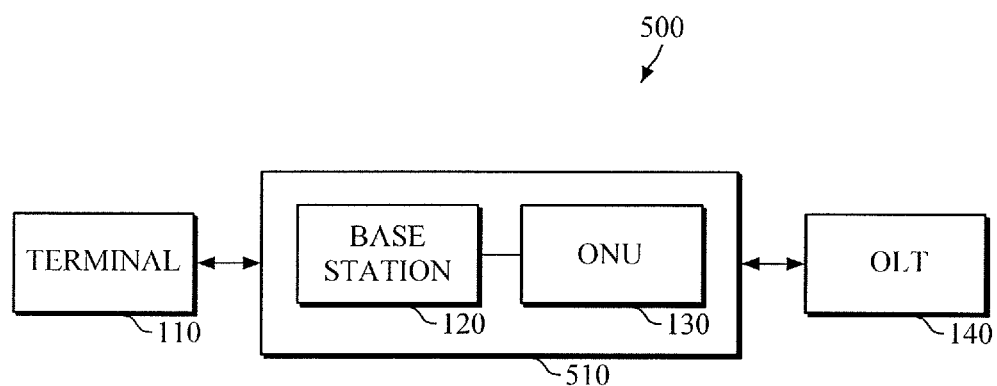
FIG. 5 is a diagram illustrating yet another example of the backhaul network system based on TDM-PON.

FIG. 5 is a diagram illustrating yet another example of the backhaul network system based on TDM-PON.

Referring to FIGS. 2 and 5, unlike the backhaul network system 100 based on TDM-PON, the backhaul network system 500 based on TDM-PON may include the base station 120 and the ONU 130 which are integrated into one device to operate as an integrated ONU 510.

Figure 6:
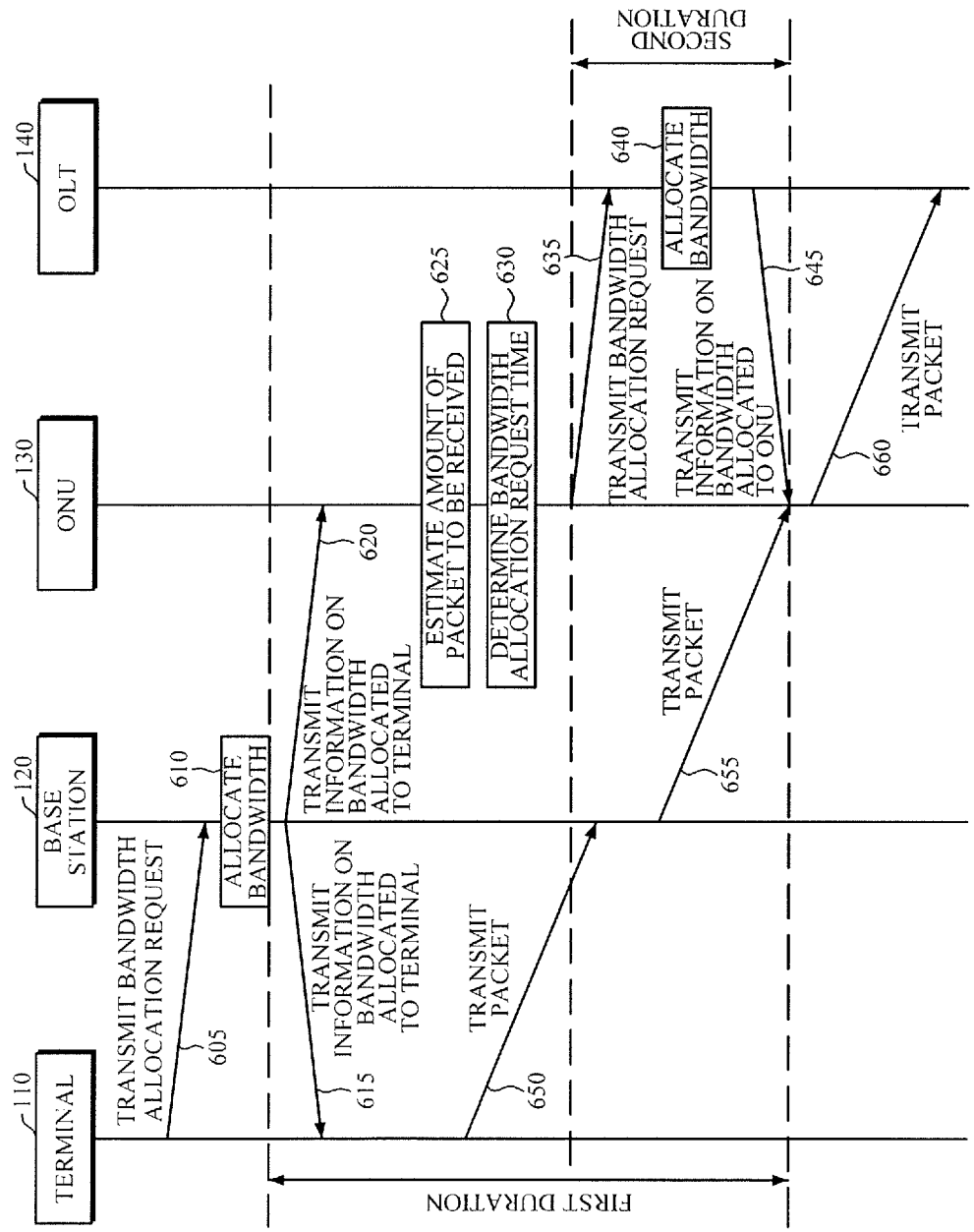
FIG. 6 is a flowchart illustrating an example of a low latency packet transmission method in the backhaul network system based on TDM-PON.

FIG. 6 is a flowchart illustrating an example of a low latency packet transmission method in the backhaul network system based on TDM-PON.

Referring to FIG. 6, in the low latency packet transmission method, the terminal 110 transmits a request for bandwidth allocation for uplink data transmission to the base station 120 in 605.

Then, upon receiving the bandwidth allocation request from the terminal 110, the base station 120 allocates a bandwidth for uplink data transmission to the terminal 110 in 610.

Subsequently, the base station 120 transmits the first bandwidth allocation information, which is information on a bandwidth allocated to the terminal 110, to the terminal 110 and the ONU 130 in 615 and 620. In this case, the operations 615 and 620 may be performed at the same time, or the operation 610 may be performed first, and then the operation 620 may be performed after a short period of time.

Next, the ONU 130 analyzes the received first bandwidth allocation information to estimate an amount of packets to be received from the base station 120 in 625. The base station 120 allocates a bandwidth to the terminal 110 by considering an amount of packets to be received from the terminal 110. Accordingly, by analyzing the first bandwidth allocation information, the ONU 130 may estimate an amount of packets to be received from the terminal 110 to the ONU 130 through the base station 120.

Then, based on the pre-stored first duration and second duration, the ONU 130 determines a bandwidth allocation request time in 630 so as to minimize a packet waiting time. In this case, the first duration is a duration from the time when the base station 120 allocates a bandwidth to the time when the ONU 130 completes packet reception; and the second duration is a duration from the time when the ONU 130 transmits a bandwidth allocation request to the OLT 140 to the time when the ONU 130 receives the second bandwidth allocation information from the OLT 140, in which the time when the ONU 130 has completed packet reception may refer to a time when a packet is received from the base station 120, and the received packet is stored in the ONU buffer 132.

In one exemplary embodiment, the ONU 130 may determine the bandwidth allocation request time by using Equation 1. That is, the ONU 130 may determine the bandwidth allocation request time by adding a time duration difference between the first duration and the second duration to the time when a bandwidth is allocated to the terminal 110.

Subsequently, the ONU 130 transmits the bandwidth allocation request to the OLT 140 at the determined bandwidth allocation request time in 635.

In one exemplary embodiment, the ONU 130 may transmit, to the OLT 140, the bandwidth allocation request that includes a packet amount estimated by analysis of the first bandwidth allocation information.

In another exemplary embodiment, the ONU 130 may transmit, to the OLT 140, information on packets estimated by analysis of the first bandwidth allocation information and information on a remaining packet amount of the ONU 130. In this case, the remaining packet amount of the ONU 130 refers to information on an amount of packets remaining in the ONU 130 after packet transmission. Even when the ONU 130 transmits a bandwidth allocation request to the OLT 140, the ONU 130 may not receive as many bandwidths as it has requested from the OLT 140. In this case, all the packets stored in the ONU 130 may not be transmitted to the OLT 140, with some of the packets remaining in the ONU 130. Accordingly, in the case where an additional bandwidth allocation request is required, the ONU 130 may transmit a bandwidth allocation request to the OLT 140 by considering a remaining packet amount.

Then, upon receiving the bandwidth allocation request, the OLT 140 allocates a bandwidth for upstream packet transmission to the ONU 130 in 640, and transmits the second bandwidth allocation information to the ONU 130, in which the second bandwidth allocation information may include an upstream transmission time, i.e., a transmission start time and a transmission duration which may be used by the ONU 130.

Next, the ONU 130 transmits packets, received from the base station 120, to the OLT 140 by using the received second bandwidth allocation information in 660. For example, the ONU 130 may transmit packets, received from the base station 120 and stored in the ONU buffer 132 (see FIG. 2), to the OLT 140 at an upstream transmission time allocated to the ONU 130.

Operation 650 of transmitting packets to the base station 120 based on the first bandwidth allocation information that the terminal 110 receives from the base station 120, and operation 655 of transmitting the packets received by the base station 120 from the terminal 110 to the ONU 130 may be performed in parallel with operations 620 to 645.

As the ONU checks in advance bandwidths allocated to terminals managed by the base station, and then receives a PON bandwidth in advance, so that an uplink transmission latency may be minimized.

The present disclosure can be realized as a computer-readable code written on a computer-readable recording medium. Codes and code segments needed for realizing the present disclosure can be easily deduced by computer programmers of ordinary skill in the art. The computer-readable recording medium may be any type of recording device in which data is stored in a computer-readable manner. Examples of the computer-readable recording medium include a ROM, a RAM, a CD-ROM, a magnetic tape, a floppy disc, an optical disk, and the like. Further, the computer-readable recording medium can be distributed over a plurality of computer systems connected to a network so that a computer-readable recording medium is written thereto and executed therefrom in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims. Further, the above-described examples are for illustrative explanation of the present invention, and thus, the present invention is not limited thereto.

What is claimed is:

1. A method of operating an Optical Network Unit (ONU) for low latency packet transmission in a Time Division Multiplexing-Passive Optical Network (TDM-PON), the method comprising:
    receiving, from a base station, first bandwidth allocation information regarding a bandwidth allocated by the base station to a terminal for uplink packet transmission; and
    transmitting a bandwidth allocation request, which is based on the received first bandwidth allocation information, to an Optical Line Terminal (OLT) before completing packet reception from the base station,
    wherein the transmitting comprises,
    analyzing the received first bandwidth allocation information to estimate an amount of packets to be received from the base station.

2. The method of claim 1, wherein the transmitting further comprises:
    transmitting the bandwidth allocation request, which includes the estimated amount of packets, to the OLT.

3. The method of claim 1, wherein the transmitting comprises:
    determining a bandwidth allocation request time by considering a pre-stored first duration and second duration; and
    transmitting the bandwidth allocation request to the OLT at the determined bandwidth allocation request time.

4. The method of claim 3, wherein the first duration is a duration from a time when the base station allocates a bandwidth to the terminal to a time when the ONU completes packet reception.

5. The method of claim 3, wherein the second duration is a duration from a time when the ONU transmits the bandwidth allocation request to the OLT to a time when the ONU receives, from the OLT, second bandwidth allocation information regarding a bandwidth allocated to the ONU.

6. The method of claim 3, wherein the determining of the bandwidth allocation request time comprises determining the bandwidth allocation request time to minimize a packet waiting time in the ONU.

7. The method of claim 3, wherein the determining of the bandwidth allocation request time comprises determining the bandwidth allocation request time by adding a time duration difference between the first duration and the second duration to the time when the bandwidth is allocated to the terminal.

8. The method of claim 1, further comprising:
    receiving, from the OLT, the second bandwidth allocation information regarding a bandwidth allocated to the ONU; and
    transmitting the packets, received from the base station, to the OLT based on the received second bandwidth allocation information.

9. The method of claim 8, wherein the second bandwidth allocation information includes a transmission start time and a transmission duration.

10. An Optical Network Unit (ONU) for low latency packet transmission in a Time Division Multiplexing-Passive Optical Network (TDM-PON), the ONU comprising:

a first bandwidth allocation information manager configured to receive, from a base station, first bandwidth allocation information regarding a bandwidth allocated by the base station to a terminal for uplink packet transmission, and a bandwidth allocation requester configured to transmit a bandwidth allocation request, which is based on the received first bandwidth allocation information, to an Optical Line Terminal (OLT) before completing packet reception from the base station, wherein:

the first bandwidth allocation information manager analyzes the received first bandwidth allocation information to estimate an amount of packets to be received from the base station; and the bandwidth allocation requester transmits the bandwidth allocation request, which includes the estimated amount of packets, to the OLT.

11. The ONU of claim 10, further comprising:

a storage configured to store a first duration and second duration; and a bandwidth allocation request time determiner configured to determine a bandwidth allocation request time by considering the stored first duration and second duration, wherein the bandwidth allocation requester transmits the bandwidth allocation request to the OLT at the determined bandwidth allocation request time.

12. The ONU of claim 11, wherein the first duration is a duration from a time when the base station allocates a bandwidth to the terminal to a time when the ONU completes packet reception.

13. The ONU of claim 11, wherein the second duration is a duration from a time when the ONU transmits the bandwidth allocation request to the OLT to a time when the ONU receives, from the OLT, second bandwidth allocation information regarding a bandwidth allocated to the ONU.

14. The ONU of claim 11, wherein the bandwidth allocation request time determiner determines the bandwidth allocation request time to minimize a packet waiting time in the ONU.

15. The ONU of claim 11, wherein the bandwidth allocation request time determiner determines the bandwidth allocation request time by adding a time duration difference between the first duration and the second duration to the time when the bandwidth is allocated to the terminal.

16. The ONU of claim 10, further comprising a second bandwidth allocation information receiver configured to receive, from the OLT, the second bandwidth allocation information regarding a bandwidth allocated to the ONU, wherein a packet sender transmits the packets, received from the base station, to the OLT based on the received second bandwidth allocation information.

17. The ONU of claim 16, wherein the second bandwidth allocation information includes a transmission start time and a transmission duration.

18. An apparatus for controlling an Optical Network Unit (ONU) for low latency packet transmission in a Time Division Multiplexing-Passive Optical Network (TDM-PON), the apparatus comprising:

a first bandwidth allocation information manager configured to receive, from a base station, first bandwidth allocation information regarding a bandwidth allocated by the base station to a terminal for uplink packet transmission, and analyze the received first bandwidth allocation information to estimate an amount of packets to be received from the base station;

a storage configured to store a first duration and a second duration; and a bandwidth allocation request time determiner configured to determine a bandwidth allocation request time by considering the stored first duration and second duration, wherein the apparatus controls the ONU to transmit the bandwidth allocation request, which includes the estimated amount of packets, to the OLT at the determined bandwidth allocation request time.

19. The apparatus of claim 18, wherein:

the first duration is a duration from a time when the base station allocates a bandwidth to the terminal to a time when the ONU completes packet reception; and the second duration is a duration from a time when the ONU transmits the bandwidth allocation request to the OLT to a time when the ONU receives, from the OLT, second bandwidth allocation information regarding a bandwidth allocated to the ONU.

* * * * *